G. W. TREICHEL.
WATER METER.
APPLICATION FILED APR. 7, 1913.
1,105,224.
Patented July 28, 1914.
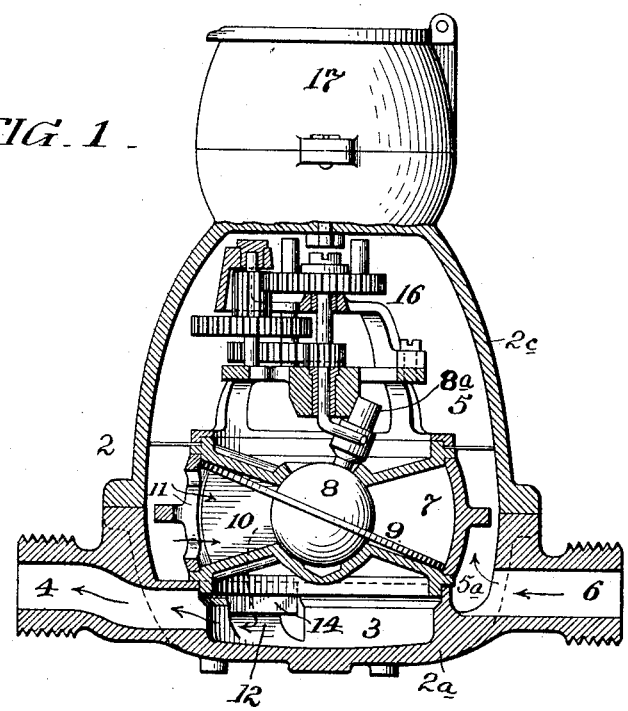
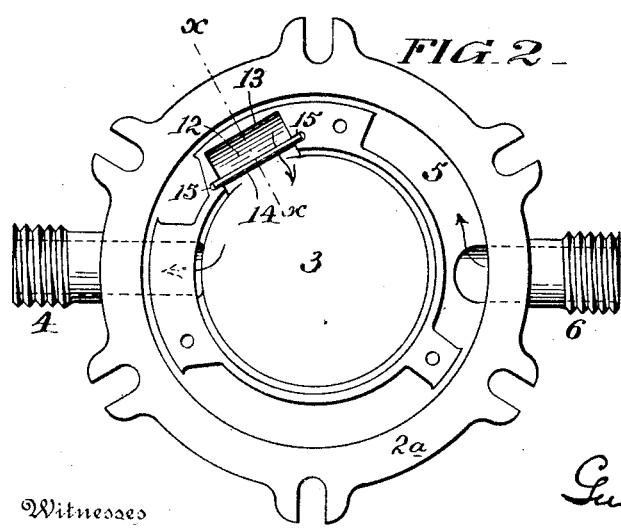
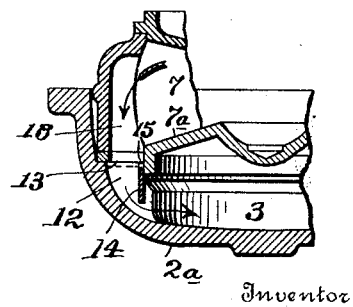
Witnesses
Daniel Webster, Jr.
E. W. Smith.
Inventor
Gustav W. Treichel
By
Attorney

UNITED STATES PATENT OFFICE.

GUSTAV W. TREICHEL, OF AMBLER, PENNSYLVANIA.

WATER-METER.

1,105,224.   Specification of Letters Patent.   Patented July 28, 1914.

Application filed April 7, 1913. Serial No. 759,295.

*To all whom it may concern:*

Be it known that I, GUSTAV W. TREICHEL, citizen of the United States, and resident of Ambler, county of Montgomery, and State of Pennsylvania, have invented an Improvement in Water-Meters, of which the following is a specification.

Heretofore it has been customary to construct many of the water meters, which find their way into commercial use, with screw threaded bosses for the inlet and outlet ports of the meter of the same construction, and with free passage for the water through the meter in either direction, though when delivered into the outlet port or in the reverse direction to that intended, the meter will register backward. This fact has led many unscrupulous persons to reverse the connection of the meter with the service and house mains for a portion of the period over which the meter is to run between the readings of its dials for purposes of computing the amount of the charge. The result of this is that reversing the connection of the meter with the mains for one-third of the period, the amount of water registered by the meter would be only one-third of the actual amount used, assuming that the amount of water actually consumed was uniform or approximately so.

The object of my invention is to provide the meter structure with means which will prevent its reversal; that is to say, if the meter were reversed in its connections with the street and house mains, it would not permit water to pass, and hence could not register backward. In view of this mode of operation, the disposition to surreptitiously reverse the meter for a portion of the time would cease and insure the legitimate registration being made.

My invention consists in providing the water passage in the body of the meter between the inlet and outlet terminals thereof with an automatic valve device, which is normally open for the free passage of water in the legitimate direction, but which automatically closes under the pressure and flow of the water when the direction of flow is reversed, said valve being positioned within the meter so as to be shielded from being tampered with.

My invention also comprehends details of construction which, together with the features above specified, will be better understood by reference to the drawings, in which:—

Figure 1 is a sectional elevation of a water meter embodying my improvements; Fig. 2 is a plan view of the base of the meter case, the upper mechanism of the meter being removed; and Fig. 3 is a sectional view of part of the meter case on line $x$—$x$ of Fig. 2 for more clearly showing the position of the valve.

The general construction of the water meter, here shown, is one form of meter in use and is illustrated as an example of a meter for more particularly explaining the nature of my invention and not by way of limitation. The case or body 2 of the meter comprises the base part $2^a$ having the inlet and outlet ports and the upper part $2^c$ having the chamber 5 which contains the operative mechanism.

The base $2^a$ is provided with chamber 3 in communication with the outlet port boss 4, and it also is provided with chamber $5^a$ in communication with the inlet port boss 6. This chamber $5^a$ opens into chamber 5 of the upper body part $2^c$. Fitted over the chamber 3 is the measuring cylinder 7 having the bottom $7^a$, a vertical partition 10, an inlet port 11 on one side of the partition, and an outlet port 18 on the other side of the partition. Within this cylinder is an oscillating or wobbling disk 9 having a ball hub 8 provided with a stem $8^a$ which acts as a rotating crank to operate the gearing 16 for actuating the registering devices in the case 17. The outlet port 18 discharges downward through a valve seat 13 and port 12 into the chamber 3, and thence to the outlet port of the port boss 4. A hinged valve piece 14 is hinged at 15 close to the valve seat 13 and normally hangs down (Figs. 1 and 3) to provide an open passage for the water.

So long as the meter is properly connected with the street and house mains to cause the water to enter at boss 6 and escape at boss 4, the meter will operate normally and register the quantity of water passed through it; but if the meter is reversed by connecting the port boss 4 with the street main and the port boss 6 with the house main, then instead of making the meter register backward, it will fail to operate and absolutely prevent its use in such connection. In this way, the proper registering of all water used is insured. The failure to operate when in reversed connection is due to the fact that the current of water in rushing upward through the passage 12 forces the pivoted valve 14 upward against its seat 13 and stops the flow to the meter cylinder and piston.

The valve 14 is gravity actuated, so as not to be dependent upon other mechanism for its operation or become clogged, but I do not confine myself to this type of valve. The valve is located out of alinement with the outlet port so that it cannot be tampered with to lock it in open position and is preferably on the discharge side of the piston and cylinder mechanism, but my invention broadly will only require an automatic or self-closing valve located at some place in the water passage between the inlet and outlet ports. I have shown a hinged plate valve acting as a normally open check valve because of its simplicity and reliability, and also because it gives a large opening, but I do not restrict myself as to the shape or character of this valve, as it may be of any suitable construction and located in such position as the construction of the meter proper may require.

I do not restrict myself to any specific construction of meter, as my invention may be adapted to any of the meters now or hereafter placed upon the commercial market, the illustration herewith given, being by way of example only.

Having now described my invention, what I claim as new and desire to secure by Letters Patent, is:—

1. In a water meter, the combination of a body part having inlet and outlet ports for connection respectively with the usual street and house mains, and also having a circuitous passage for water connecting the said inlet and outlet ports, operating mechanism for registering the amount of water which passes through the said passage, a valve seat horizontally arranged across said circuitous passage at a point out of alinement with either said inlet or outlet ports, and a freely movable valve piece loosely hinged at one side of the valve seat and adapted to normally depend therefrom under the action of gravity to permit free flow of water through the valve seat in one direction of flow, but adapted to be closed against the valve seat by the pressure of the water flowing in the opposite direction through said passage.

2. In a water meter, the combination of a body part having inlet and outlet ports for connection respectively with the usual street and house mains, and also having a laterally disposed passageway for water, following substantially the contour of the body part and communicating at its respective ends with the said inlet and outlet ports, operating mechanism for registering the amount of water which passes through said passage, a valve seat horizontally arranged across said passage and located out of alinement with either said inlet or outlet port, and at a distance therefrom, and a freely movable valve piece loosely hinged at one side of the valve seat and adapted to normally depend therefrom under the action of gravity to permit free flow of water through the valve seat in one direction of flow, but adapted to be closed against the valve seat by the pressure of the water flowing in the opposite direction through said passage.

In testimony of which invention, I hereunto set my hand.

GUSTAV W. TREICHEL.

Witnesses:
R. M. HUNTER,
A. M. KELLY.

---

Copies of this patent may be obtained for five cents each, by addressing the "Commissioner of Patents, Washington, D. C."